Feb. 15, 1966   R. J. HART   3,235,275
PACKING RING
Filed March 21, 1963   2 Sheets-Sheet 2
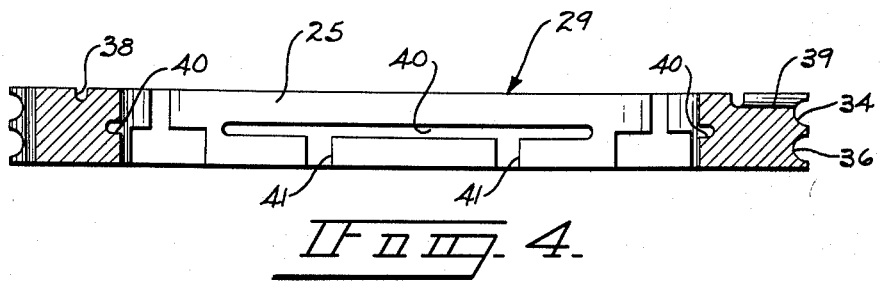
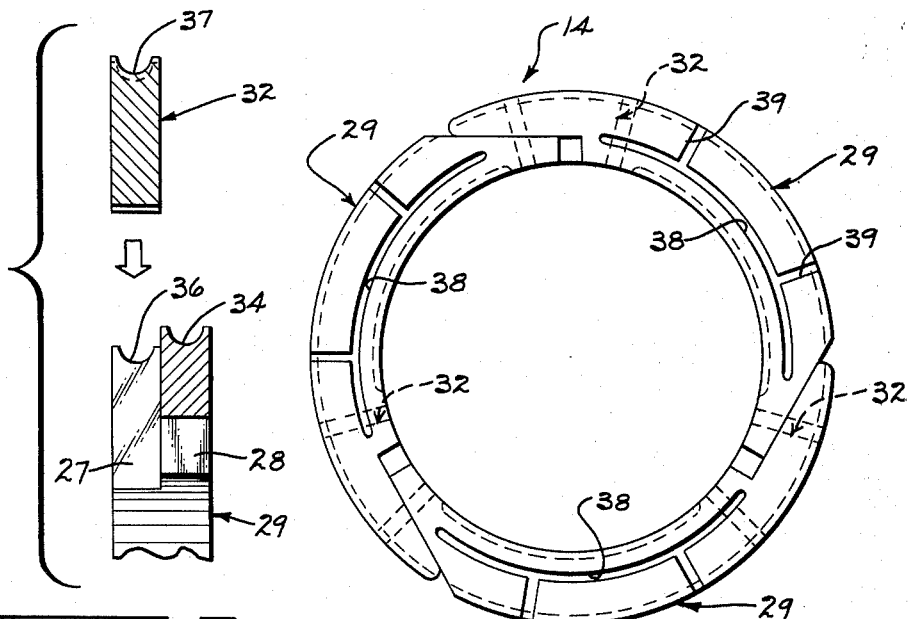
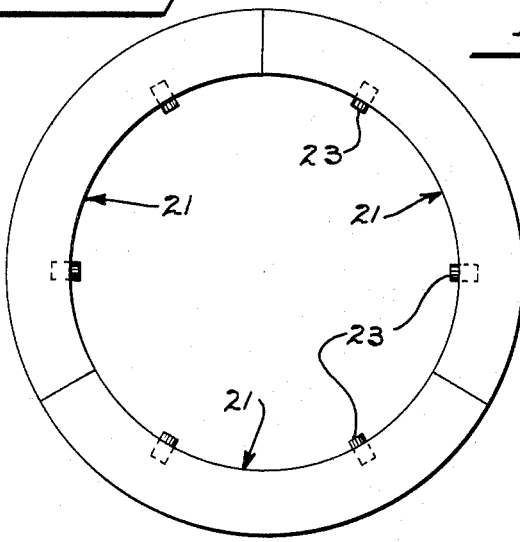
INVENTOR.
ROBERT J. HART
BY
Owen & Owen
ATTORNEYS

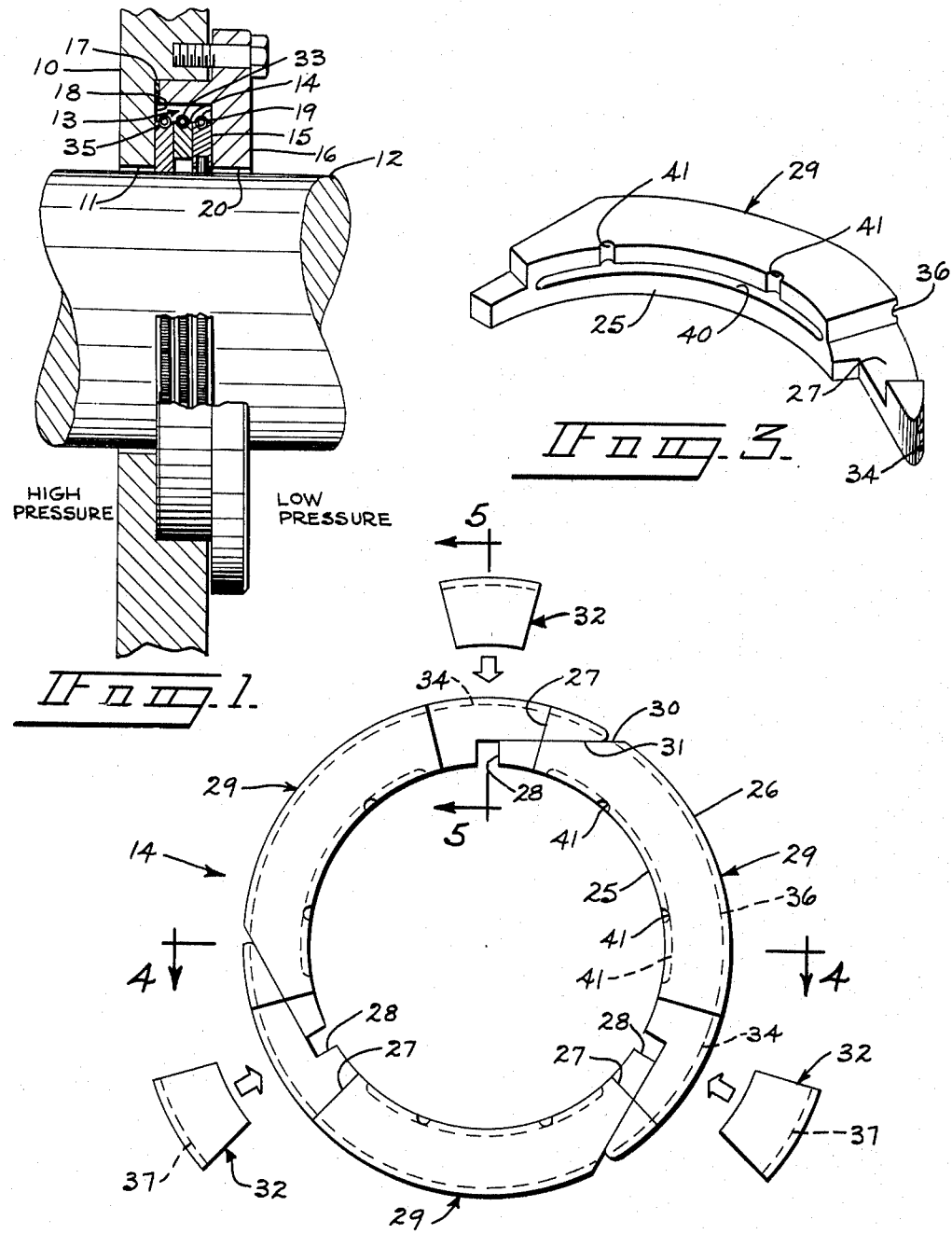

United States Patent Office 3,235,275
Patented Feb. 15, 1966

3,235,275
PACKING RING
Robert J. Hart, Mount Vernon, Ohio, assignor to The Cooper-Bessemer Corporation, Mount Vernon, Ohio, a corporation of Ohio
Filed Mar. 21, 1963, Ser. No. 267,035
3 Claims. (Cl. 277—154)

The present invention relates to packing rings for reciprocating rod members.

The prior art packing rings of the class with which the present invention is concerned are made up of a plurality of arcuate sections placed end to end to form an annular ring adapted to surround a reciprocating cylindrical member and form a sliding sealing surface therewith. The radially inner surface of the packing sections which abut the reciprocating cylindrical member wears away during use; and to compensate for this wear, an end clearance gap is provided between the ends of said arcuate sections, and the sections are biased radially inwardly. To prevent leakage through the clearance that is provided between the ends of the arcuate sections, the sections forming one annular ring are placed over sections forming a second annular ring with the end clearance gap of the sections of one ring centered on the sections of the other ring. The sections of the two rings are held in their related positions by means of dowel pins which extend between the two rings.

One of the difficulties of the prior art structures above described is that the dowel pins become loosened from their receiving openings in the sections of the annular rings or actually break off. Once the dowel pins become dislodged they may either break the sections of the annular rings, or they may work up against the reciprocating member to score the same.

The gland structures which are used to hold the packing rings in position usually have a considerable clearance between themselves and the reciprocating member to accommodate lateral movement of the reciprocating member. To prevent extrusion of the packing ring into the clearance space between the hold-down ring of the gland structure and the reciprocating member, a backup ring is interposed between the packing ring and the hold-down ring. It has been found that pressure forces exerted against the packing ring tend to cause the packing ring to adhere to the backup ring so that the packing ring does not move radially to accommodate lateral movement of the reciprocating member. This, of course, allows a leakage path to develop across the packing ring.

Still another difficulty which occurs with prior art structures is that pressure around the outside of the sections of packing ring forces the sections radially inwardly against the reciprocating member with such force as to produce excessive wear on their cylindrical surfaces which abut the reciprocating member.

An object of the present invention, therefore, is the provision of a new and improved packing ring which does not utilize dowel pins.

Another object of the invention is the provision of a new and improved packing ring and backup structure which is constructed in such manner as to decrease the force tending to cause the two to adhere together.

A further object of the invention is the provision of a new and improved packing ring which is constructed in such manner as to reduce the radially inward force tending to force the sections of the packing ring against the reciprocating member, while still maintaining an adequate sealing area and pressure.

The invention resides in certain constructions, and combinations and arrangements of parts, and further objects and advantages will become apparent to those skilled in the art to which it relates from the following description of a preferred embodiment described with reference to the accompanying drawing forming a part of this specification, and in which:

FIG. 1 is a fragmentary cross sectional view through a reciprocating rod and its cooperating sealing structure;

FIG. 2 is a side elevational view of the packing ring shown in FIG. 1, and showing three sealing sectors which are moved radially out of their assembled sealing positions;

FIG. 3 is in an isometric view of one of the sections of packing ring shown in FIG. 2;

FIG. 4 is a cross sectional view taken approximately on the line 4—4 of FIG. 2;

FIG. 5 is a cross sectional view taken approximately on the line 5—5 of FIG. 2;

FIG. 6 is an elevational view of the side opposite from that shown in FIG. 2; and FIG. 7 is a side elevational view of the backup ring shown in FIG. 1.

The sealing structure of the invention is shown in FIG. 1 in conjunction with a cylinder wall 10 having an opening 11 therein through which a piston rod 12 extends. The cylinder wall may be a part of a compressor, for example. A gland recess 13 is provided in the outer face of the cylinder wall 10 surrounding the opening 11, and a packing ring 14 and a backup ring 15 are positioned therein. The two rings are held in place by an annular retaining ring 16 that surrounds the rod 12 and which is bolted to the cylinder wall 10. Usually there are a relatively large number of packing rings stacked together in series, but for purposes of illustrating the invention only one is shown.

The retaining ring 16 is provided with an annular boss 17 which bears against the inner face 18 of the gland recess 13 to provided a predetermined clearance between its rear abutting face 19 and the inner face 18 of the gland recess 13. The opening 20 of the seal retainer 16 must accommodate some lateral movement of the rod 12 as the rod moves through the opening. The packing ring 14 is usually made of a soft non-galling material such as Teflon, which under high pressure may extrude into the opening 20, and so it is the purpose of the backup ring 15 to fit closely around the rod 12 and provide very little clearance into which the packing ring 14 can be extruded.

The backup ring 15 shown in the drawings is made of three identical arcuate sections 21, see FIG. 7, which abut each other on flat radial end surfaces 22. The sections 21 are made from brass and are prevented from rubbing against the rod 12 by means of a plurality of low friction Teflon dowels 23 (two in each section). The Teflon dowels 23 are mounted tightly in radial openings in the inner cylindrical surface 24 of the sections 21 and each projects a few thousandths of an inch out of the surface 24. (The projection of the dowels 23 has been exaggerated in FIG. 7 so that this feature will be readily apparent.)

The packing ring 14 can best be described by the manner in which it is made. An annular ring having radially inner and radially outer cylindrical surfaces 25 and 26 respectively is first prepared. The internal cylindrical surface 25 conforms in diameter to the piston rod 12 against which it is to seal. A plurality, and in the present instance three, equally spaced apart radially extending grooved areas 27 having a uniform predetermined depth equal to approximately one-half of the thickness of the packing ring are then formed (as by milling) across the face of the packing ring which is subjected to fluid pressure. Small generally rectangular openings 28 through the packing ring 14 are then cut in a position that is centered adjacent the radially inner edge of the radially extending grooves 27. The ring 14 is then divided into three identical sections 29 by cuts which, when finished, form sealing surfaces 30 and 31 that extend tangentially from and include the plane of radially outer surface of the rectangular openings 28.

The packing ring 14 is completed by three sectors 32 which have cylindrically shaped radially inner and outer surfaces which correspond to those of the sections 29. The sectors 32 have a width less than that of the radially extending grooves 27, and have a thickness which corresponds to the depth of the grooves 27. The three sections 29 are held in assembled position by an annular garter spring 33 positioned in an annular groove 34 in the outer cylindrical surface 26; and the three sealing sectors 32 are held in sealing position over the rectangular openings 28 by another garter spring 35 seated in grooves 36 and 37 in the radially outer surfaces of the sections 29 and sectors 32 respectively. The garter springs exert only sufficient force to hold the parts in assembled position and are not relied upon for sealing.

The packing ring 14 is positioned in the gland recess 13 with the sectors 32 facing the inner face 18 of the gland recess 13, and with its other side face in abutment with the backup ring 15. As previously indicated, pressure forces against the packing ring 14 can bias the ring against the backup ring 15 with such force as to adhere the two rings together and prevent relative radial movement. According to the present invention, the force tending to adhere the two rings together is reduced by providing grooves 38 in one of the abutting surfaces of the two rings, and to which grooves 38 pressure is communicated. The grooves 38 are spaced out of communication with the radially inner surface which abuts the piston rod, and extend lengthwise around the annular abutting surface. In the preferred embodiment, the grooves 38 are formed in the outer side surface of the sections 29, and the grooves 38 are connected to the radially outer surface of the packing ring by means of at least one and preferably two radial grooves 39. Fluid pressure always exists around the outer periphery of the packing ring 14, and so fluid pressure is thereby communicated not only to the area of the groove 38, but to the area between the groove 38 and the radially outer periphery of the packing ring to partially balance the force which biases the packing ring 14 against the backup ring 15. The force biasing the packing ring against the backup ring 15 can therefore be decreased by moving the position of the groove 38 radially inwardly, and can be increased by moving the position of the groove 38 radially outwardly toward the periphery of the sections 29.

Pressure around the periphery of the packing ring 14 also biases the sections 29 of the ring inwardly against the surface of the cooperating piston rod to move these sections into sealing engagement with the rod. This pressure produces wear. According to the invention, the force tending to cause the inner sealing surfaces to wear is reduced by providing a partially annular groove 40 in the radially inner or sealing surface 25 of each section 29. The groove 40 is communicated to the high pressure side of the sealing ring by at least one and preferably two grooves 41. Pressure is thereby communicated to the portion of the radially inner cylindrical surface 25 between its inner pressure face and the groove 40 to act in a radially outward direction and partially balance the radially inwardly directed force on the outer periphery of the packing ring 14.

Full pressure is not only communicated to the groove 40 but is also communicated to the area between the groove 40 and the inner surface of the section to which high pressure is communicated. The force biasing the seal sections 29 against the shaft can therefore be increased by moving the position of the groove 40 toward the pressure face of the seal, and can be decreased by moving the position of the groove 40 away from the pressure face of the seal.

In operation, pressure on the inner side face of the packing ring 14 biases the sealing sectors 32 against the surface of the grooved area 27 to seal off the rectangular openings 28. At the same time, pressure is exerted against the inner face of the sections 29 to bias them against the backup ring 15. This force, however, is reduced by pressure communicated between the packing ring 14 and backup ring 15 by the grooves 38 and 39 to such an extent that adherence between the two is prevented. In general, the high internal pressure of the cylinder will be communicated to the area between the groove 38 and the outer peripheral edge of the packing ring 14.

Pressure around the outer periphery of the packing ring 14 biases both the sections 29 of the ring and the sealing sectors 32 against the face of piston rod 12. This force is likewise reduced by a partial balancing of radial pressures due to the grooves 40 and 41 which communicate pressure to a part of the area between the piston rod 12 and the sections 29. In general, that area between the groove 40 and the inner face of the ring will be subject to the high internal pressure of the cylinder.

It will be apparent that the objects heretofore enumerated as well as others, have been achieved and that there has been provided a packing ring structure which does not utilize dowel pins, which is partially pressure biased away from the piston rod to reduce wear, and which is partially pressure biased away from its backup structure to prevent adherence thereto.

While the invention has been described in considerable detail, I do not wish to be limited to the particular constructions shown and described, and it is my intention to cover hereby all novel adaptations, modifications, and arrangements thereof which come within the practice of those skilled in the art to which the invention relates.

What I claim is:

1. A packing ring comprising a plurality of generally arcuately shaped sections which when assembled end to end define radially inner and outer cylindrical surfaces and annular side surfaces one of which is subjected to pressure and the other of which is adapted to be supported by a backup structure, the ends of said sections having tangential sealing surfaces for sliding abutment with each other, one end of said tangential surfaces terminating adjacent said inner cylindrical surface in a manner permitting reduction of the diameter of said cylindrical surfaces, each of said adjacent sections having a generally radially extending groove in the side thereof subjected to pressure which when said sections are assembled form a single grooved area which extends on either side of said one end of said tangential sealing surfaces, said grooved areas being of uniform predetermined depth, a sealing sector positioned in each of said grooved areas with clearance between a side surface of each sealing sector and a side edge of the groove in which each sector fits when said inner and outer surfaces are cylindrically arranged, each of said sectors having cylindrically shaped radially inner surfaces of a radius corresponding to the inner surface of said sections, and at least one garter spring holding said sections and sealing sectors in assembled relationship.

2. The packing ring of claim 1 wherein: said radially inner cylindrical surface of said sections has a groove extending lengthwise thereof and which is isolated from said other annular side face, and means communicating said groove with said one side face of said section which is subjected to pressure.

3. The packaging ring of claim 1 wherein: said other side face of said sections has a groove therein communicating with an area of said sections which is subjected to high pressure.

References Cited by the Examiner
UNITED STATES PATENTS

| | | | |
|---|---|---|---|
| 525,434 | 9/1894 | Walker | 277—156 |
| 1,211,613 | 1/1917 | Moore | 277—155 |
| 1,481,167 | 1/1924 | White | 277—218 |
| 1,999,094 | 4/1935 | Gordon | 277—154 XR |
| 2,590,961 | 4/1952 | Green | 277—219 |
| 2,729,477 | 1/1956 | Hamilton | 277—156 |
| 2,914,348 | 11/1959 | Kroekel | 277—157 |

LAVERNE D. GEIGER, *Primary Examiner.*

EAMUEL ROTHBERG, LEWIS J. LENNY, *Examiners.*